United States Patent
Roessler

(12) 
(10) Patent No.: US 10,657,315 B2
(45) Date of Patent: May 19, 2020

(54) GENERIC AND AUTOMATED CSS SCOPING

(71) Applicant: SAP SE, Walldorf (DE)

(72) Inventor: Andreas Roessler, Heidelberg (DE)

(73) Assignee: SAP SE, Walldorf (DE)

(*) Notice: Subject to any disclaimer, the term of this patent is extended or adjusted under 35 U.S.C. 154(b) by 511 days.

(21) Appl. No.: 15/195,546

(22) Filed: Jun. 28, 2016

(65) Prior Publication Data

US 2017/0371848 A1    Dec. 28, 2017

(51) Int. Cl.
*G06F 17/22* (2006.01)
*G06F 40/154* (2020.01)
*G06F 16/93* (2019.01)
*G06F 40/14* (2020.01)
*G06F 40/117* (2020.01)

(52) U.S. Cl.
CPC ........... *G06F 40/154* (2020.01); *G06F 16/93* (2019.01); *G06F 40/117* (2020.01); *G06F 40/14* (2020.01)

(58) Field of Classification Search
CPC ...... G06F 17/227; G06F 16/93; G06F 40/154; G06F 40/14; G06F 40/117
USPC ........................................................ 715/236
See application file for complete search history.

(56) References Cited

U.S. PATENT DOCUMENTS

| | | | | |
|---|---|---|---|---|
| 7,685,513 B2* | 3/2010 | Kibler | ................... | G06F 16/957 715/235 |
| 9,563,611 B2* | 2/2017 | Mi | .......................... | G06F 40/14 |
| 2007/0240041 A1* | 10/2007 | Pearson | ................ | G06F 40/194 715/209 |
| 2008/0313659 A1* | 12/2008 | Eide | ......................... | G06F 40/14 719/328 |
| 2009/0210498 A1* | 8/2009 | Sze | ......................... | H04L 67/04 709/206 |
| 2011/0314091 A1* | 12/2011 | Podjarny | ........... | G06F 17/30905 709/203 |
| 2012/0278700 A1* | 11/2012 | Sullivan | ................... | G06F 40/16 715/235 |
| 2013/0227396 A1* | 8/2013 | Chinnathambi | .......... | G06F 8/33 715/235 |
| 2014/0289612 A1* | 9/2014 | Mi | .......................... | G06F 40/14 715/235 |

* cited by examiner

*Primary Examiner* — Maikhanh Nguyen
(74) *Attorney, Agent, or Firm* — Buckley, Maschoff & Talwalkar LLC

(57) ABSTRACT

A system and method, including receiving a first file including a first description of a first document presentation for a document in a style sheet language; receiving a second file including a second description of a second document presentation for the document in the style sheet language, the first description and the second description being distinct from each other and differing, at least in part, from each other; generating a third file including a description of the first document presentation and the second document presentation for the document in the style sheet language by combining the first and second files; and persisting the third file in a data store.

20 Claims, 7 Drawing Sheets

200
205
```
<div class="scope container">
  <button class="button" text="Button A" />
</div>
<button class="button" text="Button B"/>
```
225
230
235
210
```
.button {
  color: black;
  background-color: green;
  border-color: black;
  width: 100px;
  height: 30px;
  border-width: 1px;
}
.scope .button {
  color: white;
  background-color: red;
  border-color: black;
  width: 100px;
  height: 30px;
  border-width: 1px;
}
```
215
220
FIG. 2

600

605
```
<div class="scope container">
  <button class="button" text="Button A" />
</div>
<button class="button" text="Button B"/>
```

610
```
.button {
  color: black;
  background-color: green;
  border-color: black;
  width: 100px;
  height: 30px;
  border-width: 1px;
}
```

615
```
.button {
  color: white;
  background-color: red;
  border-color: black;
  width: 100px;
  height: 30px;
  border-width: 1px;
}
```

620 Button A

625 Button B

630 Button A

635 Button B

640
```
.button {                          ← 645
  color: black;
  background-color: green;
  border-color: black;
  width: 100px;
  height: 30px;
  border-width: 1px;
}
.scope .button {                   ← 650
  color: white;
  background-color: red;
  border-color: black;
  width: 100px;
  height: 30px;
  border-width: 1px;
}
```

*FIG. 6*

655
```
.button {                          ← 660
  color: black;
  background-color: green;
  border-color: black;
  width: 100px;
  height: 30px;
  border-width: 1px;
}
.scope .button {                   ← 665
  color: white;
  background-color: red;
}
```

670 Button A

675 Button B

700

705 RECEIVE A FIRST FILE INCLUDING A FIRST DESCRIPTION OF A FIRST DOCUMENT PRESENTATION FOR A DOCUMENT IN A STYLE SHEET LANGUAGE

710 RECEIVE A SECOND FILE INCLUDING A SECOND DESCRIPTION OF A SECOND DOCUMENT PRESENTATION FOR THE DOCUMENT IN THE STYLE SHEET LANGUAGE, THE FIRST DESCRIPTION AND THE SECOND DESCRIPTION BEING DISTINCT FROM EACH OTHER AND DIFFERING, AT LEAST IN PART, FROM EACH OTHER

715 GENERATE A THIRD FILE INCLUDING A DESCRIPTION OF THE FIRST DOCUMENT PRESENTATION AND THE SECOND DOCUMENT PRESENTATION FOR THE DOCUMENT IN THE STYLE SHEET LANGUAGE BY COMBINING THE FIRST AND SECOND FILES

720 PERSIST THE THIRD FILE IN A DATA STORE

*FIG. 7*

GENERIC AND AUTOMATED CSS SCOPING

BACKGROUND

Graphical user interfaces provide a mechanism for users to submit input to software applications, as well as a way for the applications to communicate information to the users. In some instances, a user interface (UI) architect may produce a particular software application or a group of applications that have a certain feel or look that is characterized by a certain amount of consistency amongst the user interface elements comprising the user interfaces of the application(s). A specific aesthetic for the application(s) may be achieved by the user interfaces of the application(s) having user interface elements that are consistently shaped, colored, sized, and/or placed on the different user interfaces relating to the application(s). For example, a suite of applications from the same software manufacturer may each employ the same coloring schemes and user interface navigational controls for their presentation application, word processor application, and email client application in an effort to offer a consistent user experience to users of their applications.

While consistency across different user interfaces may be a goal of some UI developers in some instances, there may be a desire to provide some level of variation in some user interfaces of the same software applications. The level of variety may depend on the application and user expectations for the application. For example, some users of an internet browser may expect an ability to vary or personalize the look and feel of their browser, whereas users of, for example a customer relationship management application may not express much desire for personalizing the accounting application's look and feel. However, a user may want to or even expect to have some ability to personalize their user experience associated with the customer relationship management application since the ability to do so with other software applications (e.g., the internet browser they use).

BRIEF DESCRIPTION OF THE DRAWINGS

FIG. 2 is an illustrative depiction of files defining a HTML page in an example embodiment;

FIG. 6 is an illustrative depiction of some files defining a HTML page in an example embodiment;

FIG. 7 is a flow diagram of a process in an example embodiment; and

DETAILED DESCRIPTION

The following description is provided to enable any person in the art to make and use the described embodiments. Various modifications, however, will remain readily apparent to those in the art.

A style sheet language, such as cascading style sheets (CSS), may be used to describe or specify a visual presentation style of a document written in a markup language. As used herein, the visual presentation of a document is also referred to as a document presentation. The markup language can include such markup languages as HTML, XHTML, XML, variations thereof, and other markup languages now known and those that may become known. CSS may be used to describe visual presentation aspects of web pages and user interfaces. CSS enables a separation between the document content and document's presentation. The document, such as a webpage for example, may be represented as a document content file written in HTML and a document presentation the written in CSS. Together, the document content and the document presentation files can express what the webpage says (i.e., the documents content) and how the webpage looks (i.e., the documents presentation). The separation between the document content and the document presentation allows, for example, presenting the same content in a variety of different ways by maintaining the documents content (i.e., the HTML file) while the document's presentation (i.e., the documents CSS (.css) file describing the layout, size, color, font, and other visual aspects) could be modified. In another example, different content may be presented in a same visual manner by maintaining the document's presentation (e.g., a CSS file) while changing the document's content (e.g. HTML file).

In some aspects, a user interface architect (or other entity) can generate a CSS file that defines user interface elements (e.g., a button, a text color, a line's thickness, other controls, spacing and alignment of the different UI elements, etc.) for the different sections of an HTML document. There may be hundreds or even thousands of CSS classes and entities for a document and/or webpage so the tasks of designing HTML pages and user interfaces can entail considerable amounts of time and effort by UI architects and developers.

Figure 1:
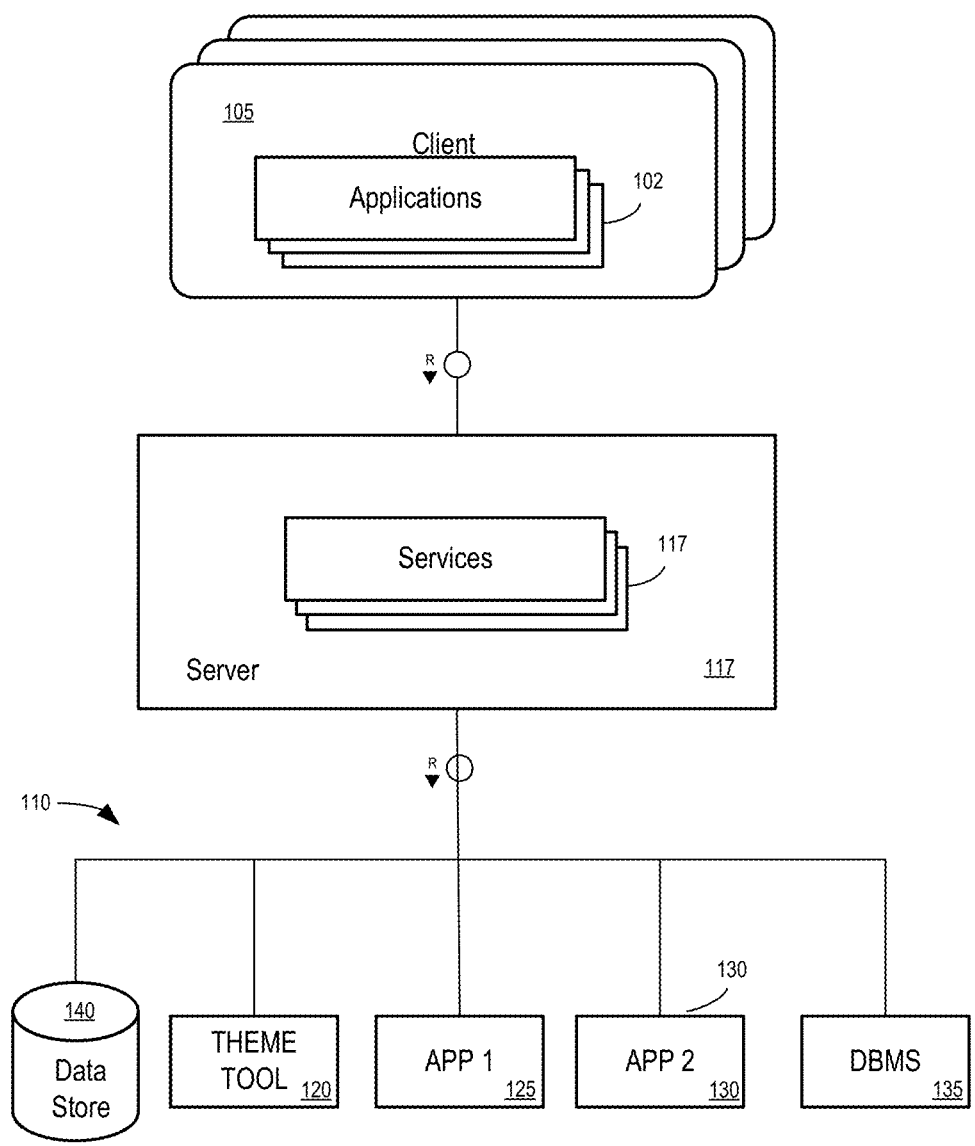
FIG. 1 is an illustrative block diagram of a system in an example embodiment.

FIG. 1 is an illustrative block diagram of an architecture or system 100, in one example. System 100 includes one or more client devices 105 running an application 102 that is supported by backend system 110. Backend 110 may provide at least some of the resources for supporting the execution (i.e., running) of the application(s) 102 by client devices 105. Embodiments of the present disclosure are not limited to the particular architecture 100 shown in FIG. 1.

Client device 105 may comprise aspects of any combination of one or more of inter alia a desktop computer, a laptop, a notebook, a tablet, a smart phone, a wearable device such as for example a smart watch, etc.

System 100 includes services 117 that execute within server 115. Services 117 can receive requests for a service from clients 105 executing applications 102 and reply with responses or results sent to applications 102 based on data stored within data store 140 that is processed by applications 120, 125, and 130 and further managed by database management system (DBMS) 135.

Services 117 may include server-side executable instructions (e.g., program instructions such as, for example, compiled code, scripts, etc.) that can provide functionality to applications 102 by providing user interfaces to clients 105, receiving requests from applications 102, retrieving data from data store 140 based on the requests, processing the data received from data store 140 by applications 120, 125, and 130, storing some of the processed data on data store 140, providing the processed data to applications 102, and presenting visualizations of the processed data. Services 117 may be made available for execution by server 115 via registration and/or other security and log-in procedures, which may be known in the art.

In one specific example, a client 105 executes an application 102 to present a user interface to a user on a display of client 105. The user enters one or more input(s) into the user interface. Application 102 operates to send or transmit a request to one of services 117. In some instances, a script, instruction, or command is generated by services 117 based on the request and forwarded to one or more of the backend systems 120 (e.g., a User Interface Theming Tool), a first application, (App1) 125, a second application (App2) 130, and DBMS 120. The applications and the DBMS may execute instructions to return a result or other response in reply to the request. In one example embodiment, the applications supported by system 100 include, for example, a theming tool 120 that might provide functionality to allow a UI architect to design user interfaces having a consistency in the visual presentation and feel of the "UI". Applications 125 and 130 may be one or more different applications.

Server 115 provides any suitable protocol interfaces through which applications 102 executing on clients 105 may communicate with services 117 executing on application server 115. For example, server 115 may include a HyperText Transfer Protocol (HTTP) interface supporting a transient request/response protocol over Transmission Control Protocol (TCP), and/or a WebSocket interface supporting non-transient full-duplex communications between server 115 and any clients 105 that implement the WebSocket protocol over a single TCP connection.

Data store 110 may comprise any data source or sources that are or become known. Data store 140 may comprise a relational database, a HTML document, an eXtensible Markup Language (XML) document, or any other data storage system storing structured and/or unstructured data files. The data of data store 140 may be distributed among several data sources. Embodiments are not limited to any number or types of data sources.

Data store 140 may implement an "in-memory" database, where a full database stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Each of clients 105 may include one or more devices executing program instructions of an application 102 for presenting user interfaces to allow user interaction with application server 115. User interfaces (not shown in FIG. 1) of applications 102 may comprise user interfaces suited for reporting, data analysis, and/or any other interface functions based on the data of data store 140.

Presentation of a user interface as described herein may comprise any extent or type of rendering, depending on a type of user interface code or instructions generated by server 117. For example, a client 102 may execute a Web Browser to request and receive a Web page (e.g., in HTML format) from application server 110 via HTTP, HTTPS, and/or WebSocket, and may render and present the Web page according to known protocols. One or more of clients 105 may also or alternatively present user interfaces by executing a standalone executable file (e.g., an .exe file) or code (e.g., a JAVA applet) within a virtual machine. In another method, one of more of clients 105 execute applications 102 loaded from server 115, that receives data and metadata by requests to services 117 executed on the server 115. Data and metadata can be processed by applications 102 to render the user interface on the client 105.

FIG. 2 is an illustrative depiction 200 of files relating to an HTML document (e.g., a user interface page), including an HTML file 205 defining content wording referred to herein as document content and a separate CSS document presentation file 210 defining metrics (i.e., dimensions) and colors for UI elements or entities for the HTML document. HTML file 205 specifies a section including a container class as shown at 225 that includes a button class in the first section as seen at 230 and a button class in a next section as seen at 235. The text content of the first button 230 is "Button A" and the text content for the second button 235 is "Button B". The CSS file describing the visual presentation of the HTML document of the FIG. 2 example is seen at 210 where the class "button" is described by the different listed metrics and their corresponding values. In the example of CSS file 210, the button is defined as comprising a clickable button having a black border and black text on a green background where the button has the listed dimensions. An example rendering of the portion of the HTML document specified by CSS file 210 and HTML file 205 is demonstrated by the output of user interface elements 215 and 220 that correspond to the black on green "Button A" and "Button B" buttons specified by HTML file 205 and CSS file 210.

FIG. 2 illustrates a simplified example of files that can be used to define a HTML document (e.g. UI interface page). A HTML document can include many sections and many different UI elements in the many different sections of the document. As a result, a HTML document can have hundreds of UI elements or entities that have to be defined and specified. In some contexts, such as an application or suite of applications adhering to a theme specification that defines a measure of consistency in at least some of the user interface components (layout design, size, colors, etc.), thousands of CSS classes may need to be defined. Such a task can be time consuming and potentially error-prone for the manual programming aspects thereof.

In one example embodiment, a theme tool application (FIG. 1, 120) may be used for theming purposes. Theme tool 120 may be used to derive a second theme from a first theme by changing the values of single or multiple parameters of the first theme and compiling the themes as CSS files that can be consumed by HTML based applications (e.g., FIG. 1, applications 125, 130, and 102). In some embodiments, the HTML applications can include, for example, UI5, WD ASAP (Web Dynpro for Advanced Business Application Programming), WD Java (Web Dynpro for Java), Web GUI (i.e., a "content management system"), Web CRM (a customer relations management), and other applications.

Changes to the visual presentation or graphic design of a document (or hundreds of documents in a themed application) might be applied by editing a few lines in the CSS file they use, rather than by changing the markup in the documents. While the separation can provide added flexibility by allowing the CSS to be changed without altering or modifying the HTML of a document or webpage, and reduces repetition in specifying the structural content of the document, the process of defining and specifying the changes for application(s) can be considerable in terms of resources (coding time, compiling time, operating and storage memory, etc.) and can be susceptible to errors if manual operations are used.

In some example themed environments, applications(s) can have graphic designs wherein multiple different appearances can be embedded in one HTML document or page. For example, a (special) container in a group (HTML page) can be visually distinct from the rest of the group (HTML page). As an example, text and UI elements within a particular container (e.g., a UI pop-up pane) of a UI may be sized and colored differently than content and UI controls in other parts of the UI. In another example, the metrics specified for a HTML document in a CSS file may specify a generous amount of spacing and padding between UI controls. However, presenting a table having many rows and/or columns with the same spacing would result in a table that exceeds the space of a screen and/or require a lot of scrolling to navigate. Thus, a UI designer may want to apply different document presentation metrics to a table in this HTML document so that all UI elements in the table are presented differently (e.g., more compact) than the UI elements (including the same type of elements and controls) in the rest of the HTML document.

Figure 3:
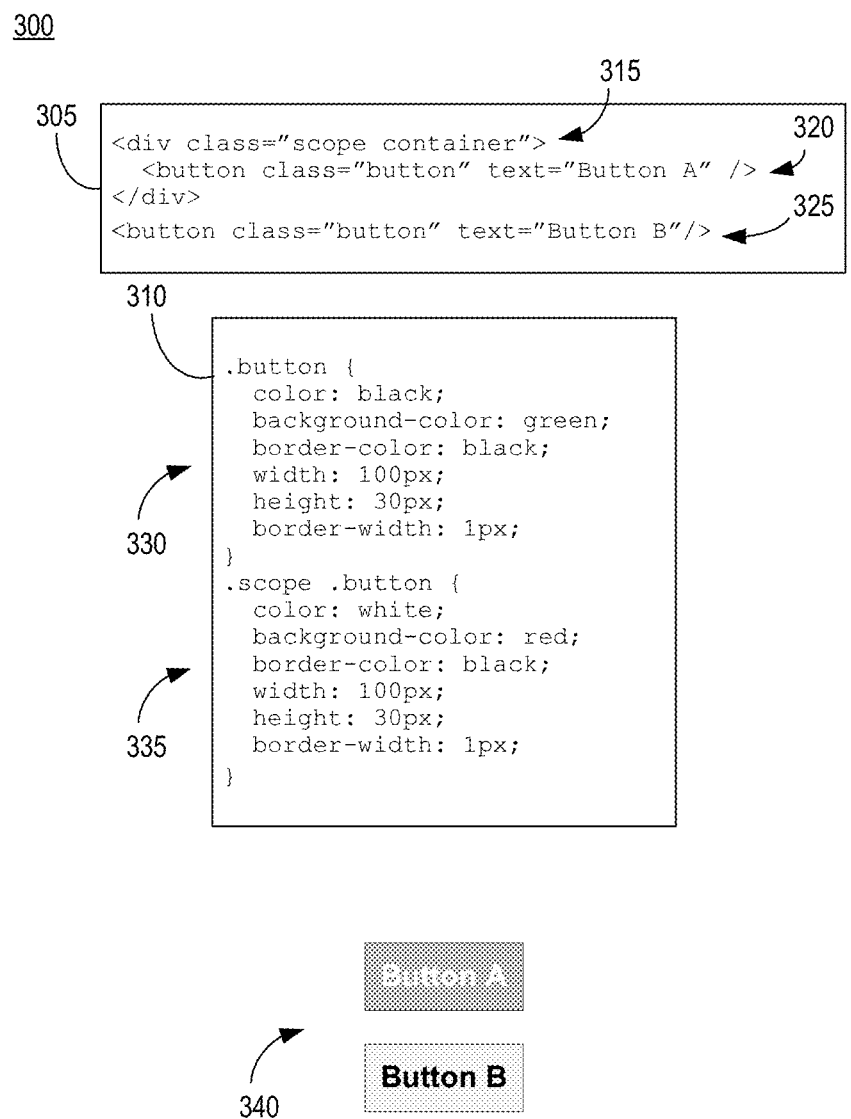
FIG. 3 is an illustrative depiction of files related to a HTML page in an example embodiment.

In some embodiments, CSS scoping may be used to specify or define different document presentations or appearances embedded within a same HTML document. FIG. 3 is an illustrative example of a use of CSS scoping to specify multiple appearances for one HTML page 300. The use of CSS scoping may technically ease efforts to define a HTML page, as well as increase efficiencies to process and render HTML pages. FIG. 3 includes a HTML file 305 specifying the content (e.g., controls, classes, wording, etc.) for the HTML page and CSS file 310 specifying the visual appearance of the controls and other content of the HTML page. FIG. 3, like other examples of HTML and CSS files herein, are illustrative examples and an actual implication may include different declarations and variations, including but not limited to differences in syntax, order, and other aspects, without any loss of generality.

HTML file 305 defines a scope container class 315, a first button class 320 ("Button A), and a second button class 325 ("Button B"). CSS file 310 includes a specification at 330 defining the appearance for the button class for the HTML document at 330 (i.e., black on green) and a specification at 335 defining the button class in the scope container in the HTML page (i.e., white on red).

An example output based on a compiling and processing of HTML file 305 and CSS file 310 is shown at 340 where Button A (listed first and having white text on a red background) and Button B (listed second and having black text on a green background) are shown arranged and colored as specified in the HTML file and the CSS file. Per HTML file 305, the appearance of the button class will be dictated as specified at 330, except for the scope container wherein the button class will adhere to the appearance defined by the metrics specified at 335.

In some aspects, a UI architect may not know which controls and HTML elements will ultimately appear in different HTML containers of HTML pages they are designing. Therefore, they might potentially need to design a new appearance for all controls. Such an effort can require a lot of resources (e.g., processing time, large CSS file sizes, etc.) and redundancies, particularly if some tasks are manually accomplished.

Figure 4:
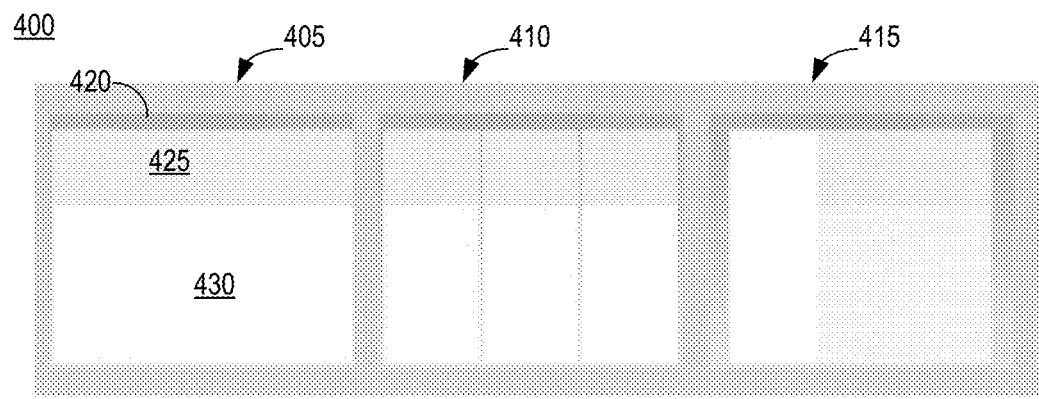
FIG. 4 is an illustrative depiction of a themed UI in an example embodiment.
Figure 5:
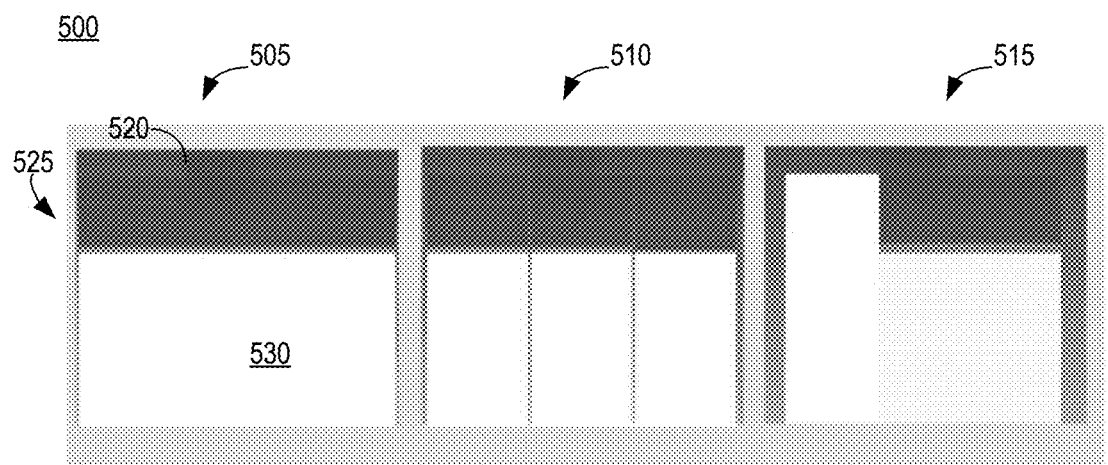
FIG. 5 is an illustrative depiction of a themed UI in an example embodiment.

FIG. 4 is an illustrative depiction of one theme for a set of user interfaces 400 for an application and FIG. 5 is an illustrative depiction of a second theme for a set of user interfaces 500 for the application. FIG. 4 includes a set of user interfaces 400, including a UI for a full screen 405 of an application, a flexible layout 410 configuration, and a detailed layout 415 configuration. FIG. 5 includes a set of user interfaces 500, including a UI for a full screen 505 of the application, a flexible layout 510 configuration, and a detailed layout 515 configuration. The UI configurations of set 400 and 500 are the same in their layout configurations but the coloring of each set will be different. That is, the theme of each is different from the other. In one example, theme 400 is referred to as a light theme and theme 500 is referred to as a dark theme. Each UI in each theme or set of UI's includes a number of UI elements that have to be described and specified in order to ensure each is appropriately colored for its particular theme. For example, full screen UI 405 (505) includes UI components 420(520), 425(525), and 430(530) that have a color consistency. The other UI layout configurations 410 (510) and 415(515) each comprises multiple UI elements (not individually referenced to maintain clarity).

FIG. 6 is an illustrative depiction of one example of a use of CSS scoping 600 to specify multiple appearances for one HTML page by combining multiple CSS files. The automatic combining of CSS files as disclosed herein technically reduces the effort(s) to define a HTML page having multiple appearances or document presentations embed in a same HTML document. It can also provide a mechanism for increasing efficiencies to generate CSS files that can be compiled, processed, and render HTML pages.

FIG. 6 includes a HTML file 605 specifying the content (e.g., controls, classes, wording, etc.) for a HTML page and CSS file 610 specifying the visual appearance of the controls and other content of the HTML page. FIG. 6, like other examples of HTML and CSS files herein, are illustrative examples and an actual implication may include different (pseudo-)code, declarations and variations, including but not limited to differences in syntax, order, and other aspects, without any loss of generality.

HTML file 605 defines a scope container class, a first button class ("Button A), and a second button class ("Button B"). The HTML file 605 may be similar in some embodiments to HTML file 305 in FIG. 3. A detailed discussion of HTML file 605 may be understood by referring to the discussion of HTML file 305 above. CSS file 610 includes a description of a first document presentation (i.e., appearance) for a button class for the HTML document (i.e., black on green) and CSS file 615 file includes a description of second document presentation (i.e., appearance) for a button class for the HTML document where an appearance of a white on red green clickable button is defined. An example rendering of Button A and Button B as specified by HTML file 605 and CSS file 610 is shown at 620 and 625 and an example rendering of a black on green Button A and white on red Button B as specified by HTML file 605 and CSS file 615 is shown at 630 and 635. As seen, two different descriptions (i.e., CSS files 610 and 615) are needed to specify the two different document presentations (i.e., buttons 620/625 and buttons 630/635).

In some example embodiments herein, a process includes combining multiple descriptions of document presentations that can be used to efficiently describe multiple document presentations embedded in one HTML document page. CSS file 640 is a third file in the example of FIG. 6. It represents a combination of CSS files 610 and 615. CSS file 640 includes, in some aspects, the descriptions of the first and second document presentations expressed in CSS files 610 and 615, respectively. CSS file 640, at 645, includes a button class description or specification that includes metrics and values for the button class for the HTML document. CSS file 640 includes, at 650, a button class description or specification that includes metrics and values for the button class in a scope container that is different than at least some of the metrics and values specified for the button class in other parts of the HTML document. In the example of FIG. 6, the border color, width, height, and border width of the button are the same for the document presentations represented by CSS files 610 and 615.

CSS file 640 may, in some example embodiments, be optimized to, for example, reduce the lines of code used or needed to describe the multiple document presentations therein. In the example of FIG. 6, CSS file 640 is optimized to obtain CSS file 655. CSS file 655 fully describes both of the document presentations (i.e., button appearances) described in CSS file 650, but using fewer lines of (pseudo-) code. As shown, CSS file 655 includes a description of the button class control at 660 (e.g., a "base" CSS file portion) that generally applies to the HTML document and a description of a button class control for the scope container wherein only the differences from the "base" CSS description 645 are explicitly listed. In the example of FIG. 6, only the description or specification of the background color and the color of the text are listed at 665 since these are the only aspects of the document presentation descriptions different from each other, as seen at 645 and 650.

In some embodiments, a process to combine CSS files representative of UI "themes" can be efficiently accomplished by automatically combining two or more (CSS) files each including a description of a different document to obtain one file that includes a description of the two or more document descriptions. In some respects, the resulting one file can be optimized to obtain a file having a reduced (minimum) amount of coding yet fully describes all of the multiple document presentations.

FIG. 7 comprises a flow diagram of process 700, according to some embodiments herein. In some embodiments, various hardware elements of systems within the scope of the present disclosure execute program instructions to perform process 700. Process 700 and all other processes mentioned herein may be embodied in computer-executable program instructions read from one or more of a tangible non-transitory computer-readable media, such as a floppy disk, a CD-ROM, a DVD-ROM, solid state memory device, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In one aspect, an application (e.g., 102, 120), service (e.g., 115), or system (e.g., 100) may be invoked to create themes or other UI pages and documents where a HTML document or page includes two or more document presentations in the same HTML document or page.

Operation 705 includes receiving a first file, e.g., a CSS file, including a first description of a first document presentation. As shown in some of the examples herein, the file is written or otherwise expressed in a style sheet language. Although the language is CSS in some of the examples herein, such is not a necessary limitation. The first file may be, for example, file 610 of FIG. 6.

Operation 710 includes receiving a first file including a second description of a second document presentation. Hereto, the file is written or otherwise expressed in a style sheet language. The second file may be, for example, file 615 of FIG. 6. In some instances, operations 705 and 710 may be proceeded by a generation of the files 705 and 710. However, such is not a requirement of an entity performing and/or controlling the execution of process 700 and the files 705 and 710 may be obtained from a data store (e.g., 140), a third-party (e.g., commercial library), or an open source. The designation of a first file, a second file, a first description, a second description, a first document presentation, a second document presentation, other such distinctions between files, descriptions, and document presentations are made to distinguish between distinct files, descriptions, and document presentations, not as an indicator or a hierarchy or priority, unless otherwise noted herein.

At operation 715, a third file (e.g., file 655 of FIG. 6) can be generated by combining the two files received at operations 705 and 715, respectively. In some aspects, files 705 and 710 may be considered inputs to an application (e.g. theming tool 120) or a service (e.g., 115). The generated third file includes a description of the first document presentation and the second document presentation sufficient to fully describe each of the first and second document presentations.

In some embodiments, the third file can be optimized to include a reduced lines of code as compared to the first and second files. The optimization of the third file may occur as part of operation 715 or separate operation(s). The optimization, like operation 715, may be invoked automatically in response to, for example, an indication that the first and second files are to be combined.

At operation 720, the third file may be persisted to a data store or repository where, in some embodiments, it can be used and/or re-used in a UI theming process. Process 700 and some other examples is illustrated combining two files to result in one third file. It is noted that the present disclosure encompasses the combination of multiple files (e.g., a file 1, a file 2, and a file 4) to obtain one file that can be processed to render a HTML page including embedded document presentations corresponding to the document presentations of each of the multiple files.

Figure 8:
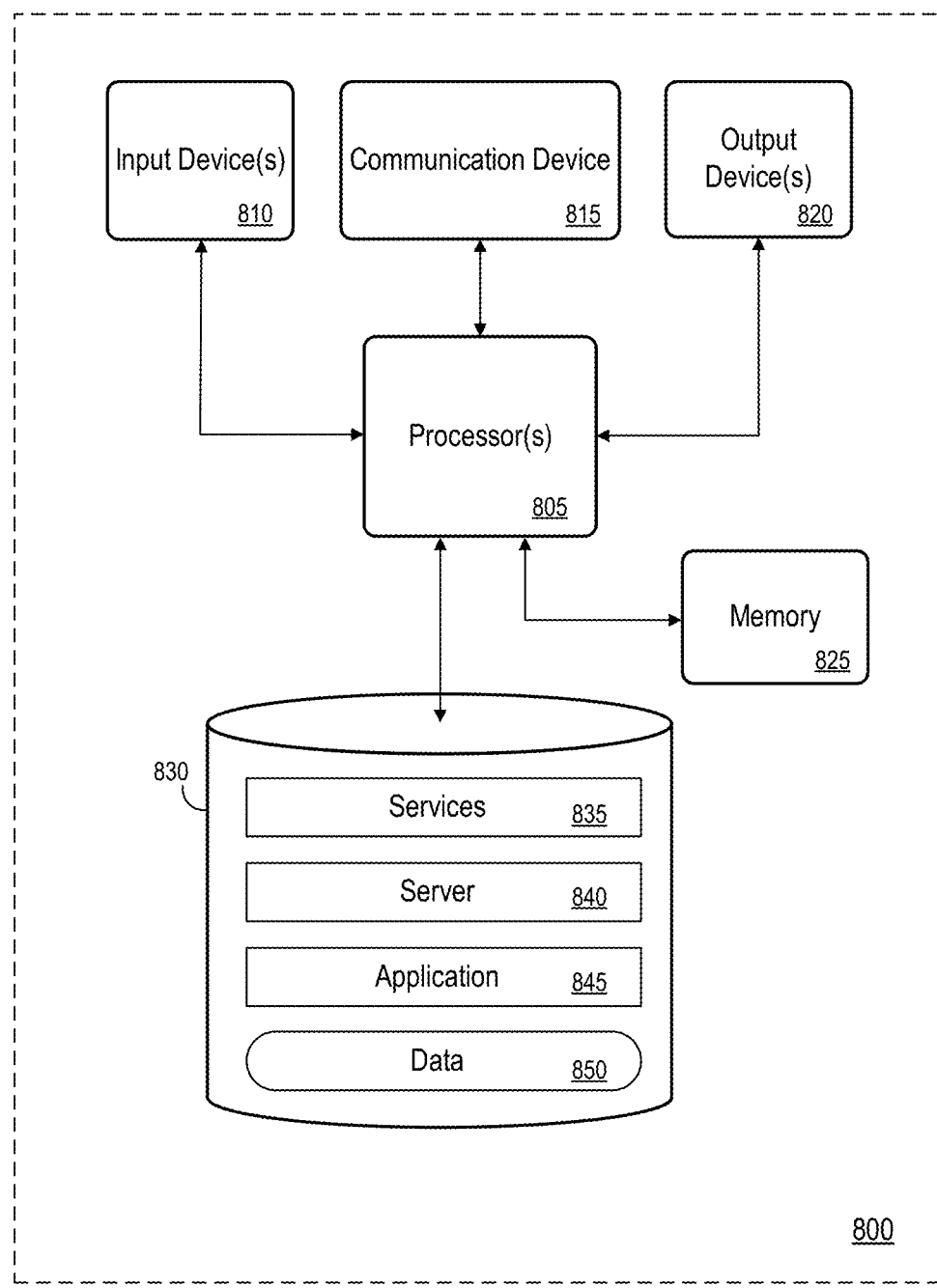
FIG. 8 is a block diagram of an apparatus in an example embodiment.

FIG. 8 is a block diagram of apparatus 800 according to some embodiments. Apparatus 800 may comprise a computing apparatus and may execute program instructions to perform any of the functions described herein. Apparatus 800 may comprise an implementation of server 115, DBMS 135 and data store 140 of FIG. 1 in some embodiments. Apparatus 800 may include other unshown elements according to some embodiments.

Apparatus 800 includes processor 805 operatively coupled to communication device 820, data storage device 830, one or more input devices 810, one or more output devices 820 and memory 825. Communication device 815 may facilitate communication with external devices, such as a reporting client, or a data storage device. Input device(s) 810 may comprise, for example, a keyboard, a keypad, a mouse or other pointing device, a microphone, knob or a switch, an infra-red (IR) port, a docking station, and/or a touch screen. Input device(s) 810 may be used, for example, to enter information into apparatus 800. Output device(s) 820 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), solid state storages device, optical storage devices, Read Only Memory (ROM) devices, etc., while memory 860 may comprise Random Access Memory (RAM), Storage Class Memory (SCM) or any other fast-access memory.

Services 835, server 840, and application 845 may comprise program instructions executed by processor 805 to cause apparatus 800 to perform any one or more of the processes described herein. Embodiments are not limited to execution of these processes by a single apparatus.

Data 850 (either cached or a full database) may be stored in volatile memory such as memory 825. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method to specify multiple different presentations for a document, the method comprising:
   receiving a first file including a first description of a first document presentation for a first document, the first description being a specification of a first visual appearance, in a style sheet language, for the first document;
   receiving a second file including a second description of a second document presentation for the first document, the second description being a specification of a second visual appearance, in the style sheet language, for the first document and the first description and the second description being distinct from and differing, in part, from each other such that the specified first and second visual appearances for the first document are different;
   generating a third file including a description of both the first document presentation and the second document presentation for the first document in the style sheet language by combining the first and second files to specify multiple different presentations for the first document;
   optimizing the third file to include both the first document presentation and the second document presentation for the first document with minimal repetition in the style sheet language; and
   persisting the third file in a data store.

2. The method of claim 1, wherein the style sheet language is Cascading Style Sheet language.

3. The method of claim 1, wherein the first document is a markup language document and the third file is compiled to render the first document having both the first document presentation and the second document presentation embedded in the markup language document.

4. The method of claim 1, wherein the description of the first document presentation and the second document presentation in the optimized third file comprises the first description and the part of the second description differing from the first description.

5. The method of claim 1, wherein the combining of the first and second files to produce the third file is automatically performed by at least one of an executing application, service, device, and combinations thereof.

6. The method of claim 1, further comprising:
   receiving a fourth file including a fourth description of a fourth document presentation for the first document in the style sheet language, the fourth description being a specification of a fourth visual appearance, in the style sheet language, for the first document and the first description and the fourth description being distinct and differing, at least in part, from each other such that the first and fourth visual appearances for the first document are different; and
   generating the third file including a description of each of the first document presentation, the second document presentation, and the fourth document presentation for the first document in the style sheet language by combining the first and second files and the first and fourth files to specify multiple different presentations for the first document, wherein the third file is optimized to include the first document presentation, the second document presentation, and the fourth document presentation for the first document with minimal repetition in the style sheet language.

7. The method of claim 6, wherein the description of the first document presentation, the second document presentation, and the fourth document presentation in the optimized third file comprises the first description and the parts of the second description and fourth description differing from the first description.

8. A system to specify multiple different presentations for a document, the system comprising:
   a memory storing processor-executable instructions; and
   a processor to execute the processor-executable instructions to cause the system to:
      receive a first file including a first description of a first document presentation for a first document, the first description being a specification of a first visual appearance, in a style sheet language, for the first document;
      receive a second file including a second description of a second document presentation for the first document, the second description being a specification of a second visual appearance, in the style sheet language, for the first document and the first description and the second description being distinct and differing, in part, from each other such that the specified first and second visual appearances for the first document are different;
      generate a third file including a description of both the first document presentation and the second document presentation for the first document in the style sheet language by combining the first and second files to specify multiple different presentations for the first document;
      optimize the third file to include both the first document presentation and the second document presentation for the first document with minimal repetition in the style sheet language; and
      persist the third file in a data store.

9. The system of claim 8, wherein the style sheet language is Cascading Style Sheet language.

10. The system of claim 8, wherein the first document is a markup language document and the third file is compiled to render a markup language the first document having both the first document presentation and the second document presentation embedded in the markup language document.

11. The system of claim 8, wherein the description of the first document presentation and the second document presentation in the optimized third file comprises the first description and the part of the second description differing from the first description.

12. The system of claim 8, wherein the combining of the first and second files to produce the third file is automatically performed in response to receiving the first and second files.

13. The system of claim 8, further comprising:
receiving a fourth file including a fourth description of a fourth document presentation for the first document in the style sheet language, the fourth description being a specification of a fourth visual appearance, in the style sheet language, for the first document and the first description and the fourth description being distinct and differing, at least in part, from each other such that the first and fourth visual appearances for the first document are different; and
generating the third file including a description of each of the first document presentation, the second document presentation, and the fourth document presentation for the first document in the style sheet language by combining the first and second files and the first and fourth files to specify multiple different presentations for the first document, wherein the third file is optimized to include the first document presentation, the second document presentation, and the fourth document presentation for the first document with minimal repetition in the style sheet language.

14. The system of claim 13, wherein the description of the first document presentation, the second document presentation, and the fourth document presentation in the optimized third file comprises the first description and the parts of the second description and fourth description differing from the first description.

15. A non-transitory computer-readable medium storing processor executable instructions to specify multiple different presentations for a document, the, the medium comprising:
instructions to receive a first file including a first description of a first document presentation for a first document, the first description being a specification of a first visual appearance, in a style sheet language, for the first document;
instructions to receive a second file including a second description of a second document presentation for the first document, the second description being a specification of a second visual appearance, in the style sheet language, for the first document and the first description and the second description being distinct and differing, in part, from each other such that the specified first and second visual appearances for the first document are different;
instructions to generate a third file including a description of both the first document presentation and the second document presentation for the first document in the style sheet language by combining the first and second files to specify multiple different presentations for the first document;
instructions to optimize the third file to include both the first document presentation and the second document presentation for the first document with minimal repetition in the style sheet language; and
instructions to persist the third file in a data store.

16. The medium of claim 15, wherein the style sheet language is Cascading Style Sheet language.

17. The medium of claim 15, wherein the first document is a markup language document and the third file is compiled to render the first document having both the first document presentation and the second document presentation embedded in the markup language document.

18. The medium of claim 15, wherein the description of the first document presentation and the second document presentation in the optimized third file comprises the first description and the part of the second description differing from the first description.

19. The medium of claim 15, wherein the combining of the first and second files to produce the third file is automatically performed in response to receiving the first and second files.

20. The medium of claim 15, further comprising:
instructions to receive a fourth file including a fourth description of a fourth document presentation for the first document in the style sheet language, the fourth description being a specification of a fourth visual appearance, in the style sheet language, for the first document and the first description and the fourth description being distinct and differing, at least in part, from each other such that the first and fourth visual appearances for the first document are different; and
instructions to generate the third file including a description of each of the first document presentation, the second document presentation, and the fourth document presentation for the first document in the style sheet language by combining the first and second files and the first and fourth files to specify multiple different presentations for the first document, wherein the third file is optimized to include the first document presentation, the second document presentation, and the fourth document presentation for the first document with minimal repetition in the style sheet language.

* * * * *